O. F. GREIM.
AUTOMATIC PRESSURE REGULATOR FOR GAS COLLECTING MAINS.
APPLICATION FILED OCT. 5, 1908.

974,260.

Patented Nov. 1, 1910.
4 SHEETS—SHEET 1.

Witnesses:
Fred Palm
Chas. L. Goss.

Inventor:
Otto F. Greim
By Whittler, Handers, Bottum & Trawsett
Attorneys.

O. F. GREIM.
AUTOMATIC PRESSURE REGULATOR FOR GAS COLLECTING MAINS.
APPLICATION FILED OCT. 5, 1908.

974,260.

Patented Nov. 1, 1910.

4 SHEETS—SHEET 3.

Witnesses:
Fred Palm
Chas. L. Goss

Inventor:
Otto F. Greim
By Winkler, Flanders, Bottum & Fowsett
Attorneys.

O. F. GREIM.
AUTOMATIC PRESSURE REGULATOR FOR GAS COLLECTING MAINS.
APPLICATION FILED OCT. 5, 1908.

974,260.

Patented Nov. 1, 1910.
4 SHEETS—SHEET 4.

Witnesses:
Fred Palm
Chas. L. Goss.

Inventor:
Otto F. Greim
By Winkler Flanders Bottum & Fawsett
Attorneys.

UNITED STATES PATENT OFFICE.

OTTO F. GREIM, OF MILWAUKEE, WISCONSIN, ASSIGNOR TO THE MILWAUKEE COKE AND GAS COMPANY, OF MILWAUKEE, WISCONSIN, A CORPORATION OF WISCONSIN.

AUTOMATIC PRESSURE-REGULATOR FOR GAS-COLLECTING MAINS.

974,260. Specification of Letters Patent. Patented Nov. 1, 1910.

Application filed October 5, 1908. Serial No. 456,139.

*To all whom it may concern:*

Be it known that I, OTTO F. GREIM, a citizen of the United States, residing at Milwaukee, in the county of Milwaukee and State of Wisconsin, have invented certain new and useful Improvements in Automatic Pressure-Regulators for Gas-Collecting Mains, of which the following is a specification, reference being had to the accompanying drawing, forming a part thereof.

This invention relates to means for regulating and controlling the pressure in the collecting or so called "hydraulic" mains into which the gas is delivered from the ovens of coke plants or from the retorts of gas works. Its main objects are to automatically control and to accurately and reliably regulate the pressure in such mains, and generally to improve the construction and operation of apparatus for this purpose.

It consists in certain novel features of construction and in the peculiar arrangement and combinations of parts as hereinafter particularly described and pointed out in the claims.

In the accompanying drawing like characters designate the same parts in the several figures.

Figure 1:
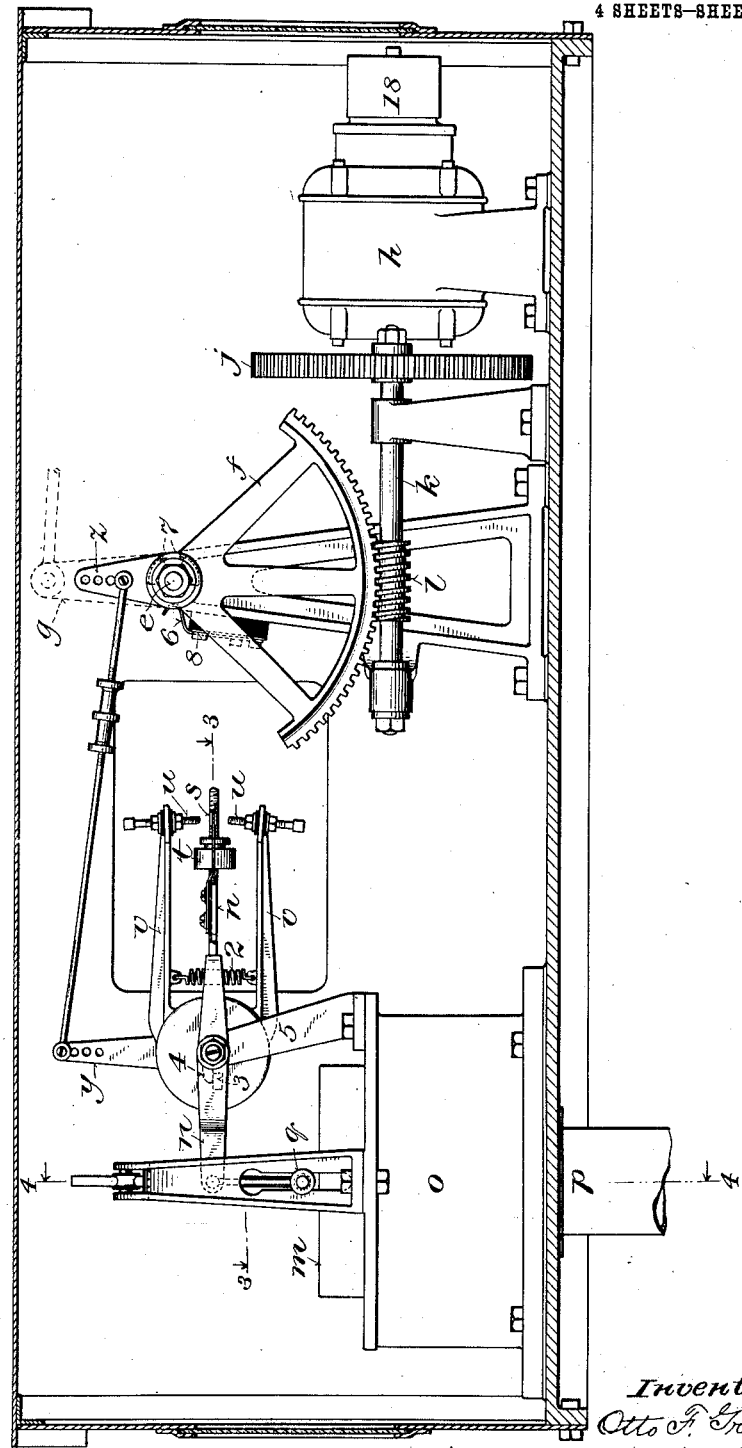
Figure 2:
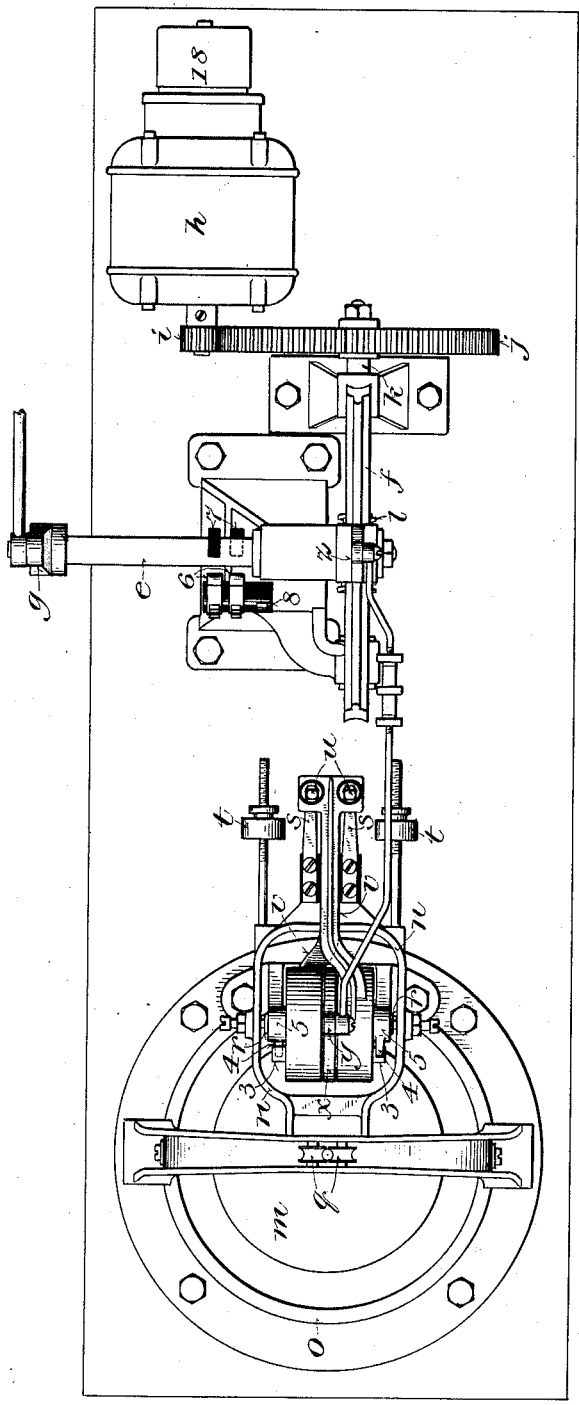
Figure 3:
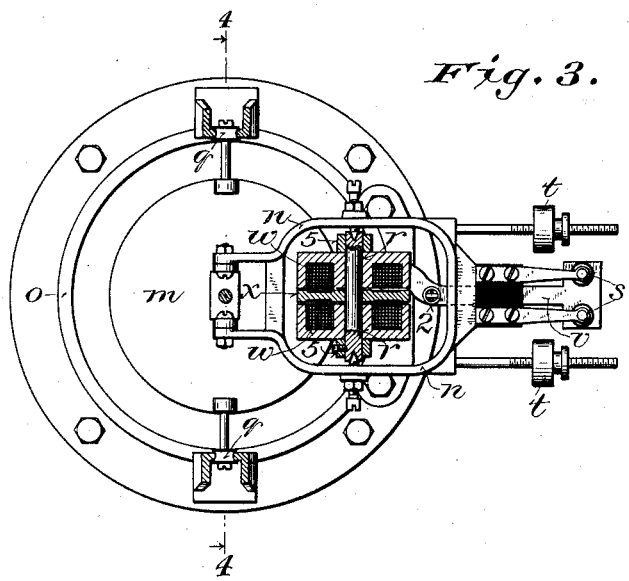
Figure 4:
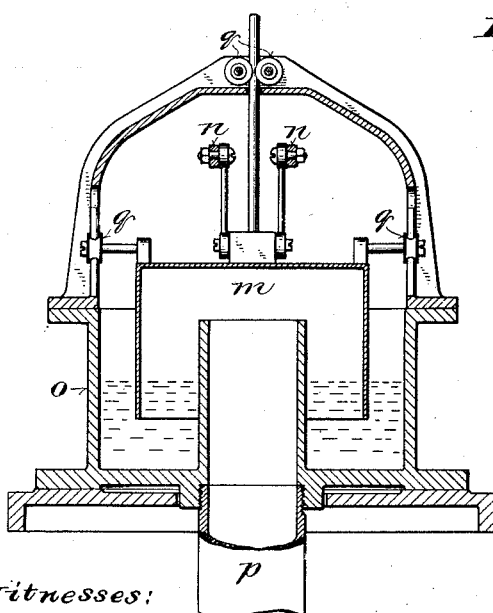

Figure 1 is a side elevation of the mechanism of a regulator embodying the invention, the protecting case being shown in section; Fig. 2 is a plan view of the mechanism of the regulator; Fig. 3 is a horizontal section on the line 3 3, Fig. 1; Fig. 4 is a vertical section on the line 4 4, Figs. 1 and 3; and Fig. 5 is a diagram showing the electric connections of the regulator and its connections with a gas collecting main.

Figure 5:
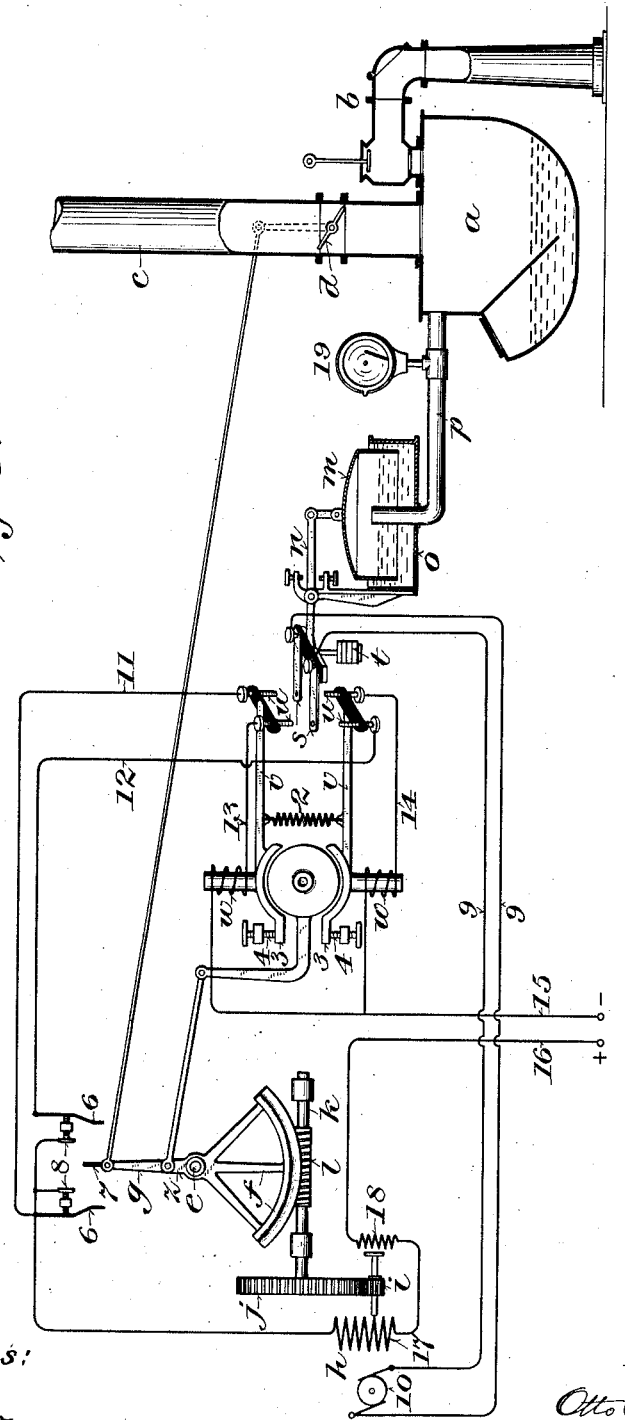

Referring to Fig. 5, $a$ designates a gas collecting conduit or so called "hydraulic" main, into which gas is delivered from coke ovens or from the retorts of a gas works through pipes $b$. $c$ is a pipe called the foul main, through which the gas is pumped or drawn from the collecting main $a$ to washers or purifying apparatus. A valve $d$ regulates the flow of gas from the main $a$ through the pipe $c$ and hence regulates the pressure in said main, in which a low pressure is maintained according to the usual practice.

Referring now to the other figures of the drawing showing the regulator proper in its preferred form, $e$ is a rocker shaft provided with a segment worm gear $f$ and with an arm $g$ which is connected as shown in Fig. 5, by a rod or otherwise, with an arm on the stem of the valve $d$.

$h$ is an electric motor having a pinion $i$ on its armature shaft meshing with a gear $j$ on a shaft $k$ which is provided with a worm $l$ meshing with the gear $f$.

An expansion chamber consisting in the present instance of a bell or float $m$ suspended from a yoke or lever $n$ in a receptacle $o$ containing a sealing liquid, is connected as shown in Fig. 5, by a pipe $p$ with the main $a$. The bell or float $m$ is delicately guided in its vertical movement by rollers $q$. The yoke or lever $n$ is fulcrumed as shown in Fig. 3, by cone-pointed screws in the ends of a short horizontal shaft $r$, and upon its end opposite the float $m$ are mounted a pair of insulated spring or yielding contact pieces $s$. This yoke or lever is also provided with a pair of screw rods on which weights $t$ are threaded for accurately balancing the bell or float $m$ when it is subjected to the pressure it is desired to maintain in the collecting main $a$. On opposite sides and in the paths of the contact springs $s$ insulated contact pieces $u$ are carried by arms $v$, which are pivotally mounted on the shaft $r$ concentric with the axis or fulcrum of the yoke or lever $n$.

The contact pieces $u$ preferably consist of screws which are separately adjustable in the arms $v$, so that they may be accurately set to properly engage with the springs $s$. At their pivoted ends the arms $v$ are formed with recessed hubs containing magnet coils $w$, and between them is pivotally mounted on the shaft $r$ an oscillatory disk $x$ having an arm $y$ adjustably connected by a rod with an arm $z$ on the rocker shaft $e$. The recessed hubs of the arms $v$ with their magnet coils and the interposed disk $x$ serve as clutches to connect the motor with either pair of contact pieces $u$ through which the circuit may be closed, as hereinafter explained. A spring 2 connecting the arms $v$, tends to draw them together toward the intermediate contact springs $s$, their movement in this direction being limited by the engagement of lugs 3 on the hubs of the arms with lugs 4 on the standards 5 supporting the shaft $r$. In the central normal position of the contact springs $s$ the contact screws $u$ are thus held out of engagement therewith.

To prevent accidental overrunning of the mechanism at the limits of the desired movement in opposite directions of the valve $d$, safety stops or circuit breakers are provided, consisting of insulated springs 6, mounted in the paths of insulating trip cams 7 on the shaft $e$, and connected in series with one pair of the contact pieces $u$, and normally engaging with a metallic plate or bar 8 which is connected with one of the mains of the circuit.

The electrical connections of the regulator may be conveniently made substantially as shown in Fig. 5. The contact springs $s$ are connected by conductors 9 with the armature 10 of the motor. The contact screws $u$ are cross connected by conductors 11, 12, 13 and 14 with the circuit breaker springs 6, and one circuit main 15, the magnet coils $w$ being included in the conductors 13 and 14 in series with one of the upper and one of the lower contact pieces. The contact plate or bar 8 of the safety stops or circuit breakers is connected with the other circuit main 16 in which the field 17 of the motor and a magnetic motor brake 18 may be included.

The apparatus is preferably provided at some convenient point, as in the pipe $p$, with a gage 19, to indicate the pressure in the collecting main $a$.

The operation of the regulator may be briefly explained as follows by reference to Fig. 5, in which the valve $b$ is shown partially open and the electric contact pieces in their normal positions: Assuming now that the pressure in the main $a$ drops slightly, the bell or float $m$ will descend, carrying the contact springs $s$ into engagement with the upper pair of contact screws $u$. This will close the motor circuit from the main 16 through the conductor 11, conductors 9, armature 10 and conductor 13 to the other main 15. The magnetic brake 18 being thus released, the motor will start and swing the rocker arm $g$ to the left, thereby closing the valve $d$ more or less according to the extent of the descent of the bell or float $m$ and the flexure of the contact springs $s$, by engagement with the upper contact screws $u$. Upon the closing of the circuit as above stated, the clutch magnet of the upper arm $v$ is energized, gripping the hub of said arm to the disk $x$, which is being turned to the left by the movement of the arm $z$. The upper contact screws $u$ are thus carried upward against the tension of the spring 2 and the circuit will be broken and the motor stopped as soon as the springs $s$ are straightened and the screws $u$ are moved out of engagement therewith. The flow of gas from the main $a$ through the pipe $c$ is thus slightly checked or reduced, and this tends to increase the pressure in said main. When the motor circuit is broken as above stated, the clutch magnet $w$ is deënergized and the upper pair of contact screws $u$ is returned to its original position by the spring 2, its movement being limited by engagement of the associated stop lugs 3 and 4. In the meantime if the pressure in the main $a$ has not been increased sufficiently to return the bell or float $m$ and the springs $s$ to their normal positions, the upper contact screws $u$ in their descent will again engage with said springs, close the motor circuit and further close the valve $d$ as above explained, gradually moving the valve $d$ step by step toward its closed position until the normal pressure in the main $a$ has been restored and the bell or float $m$ and the contact springs $s$ returned to their original normal positions. In case the pressure in the main $a$ rises above the normal for which the governor is adjusted, the bell or float $m$ will be lifted and move the contact springs $s$ downward into engagement with the lower pair of contact screws $u$, thereby closing the motor circuit through the conductors 12 and 14, and the lower pair of contact screws, and reversing the current through the conductors 9 and the motor armature 10. The motor being thus started in a reverse direction, swings the rocker arm $g$ to the right, opening the valve $d$ slightly more and permitting a slightly increased flow of gas from the main $a$ through the pipe $c$. During this operation the hub of the lower arm $v$ is clutched to and turned with the disk $x$ to the right, thereby carrying the lower contact screws $u$ downward till the springs $s$ are straightened and the circuit is broken, whereupon said arm and contact screws will be instantly returned to their original positions by the spring 2. If normal pressure in the main $a$ has not been restored and the springs $s$ returned to their middle and normal position, the circuit will be again closed, and the valve $d$ turned by the motor another interval in the same direction. These operations will be repeated gradually opening the valve step by step until normal pressure is established in the main $a$ and the contact pieces of the governor resume their original normal positions, as shown by the drawing. This gradual step by step operation of the governor and movement of the regulating valve $d$ avoids abrupt fluctuations in pressure due to the momentum of parts of the mechanism, and insures a substantially constant pressure in the collecting main $a$ without care or attention.

Various modifications in the details of construction and arrangement of parts of the apparatus may be made without departing from the principle and scope of the invention.

I claim:

1. The combination with a gas collecting main and a valve controlling the pressure in said main, of a motor connected with a source of power independent of the pressure in said main and adapted to move said valve in opposite directions, a movable part subjected to the pressure in said main and means connected with said movable part and controlling the operation of said motor according to variations of pressure in said main, substantially as described.

2. The combination with a gas collecting main and a valve controlling the pressure in said main, of a motor for operating said valve, an expansion chamber communicating with said main and having a movable part and means connected with said movable part and controlling the operation of the motor according to variations of pressure in said main, substantially as described.

3. The combination with a gas collecting main and a valve controlling the pressure in said main, of means for operating said valve and means for automatically controlling the valve operating means comprising a movable part subjected to the pressure in said main, a movable electric contact piece connected with said movable part, and opposing movable electric contact pieces arranged on opposite sides and in the path of the other contact piece and each adapted to be shifted by the valve operating means away from the intermediate contact piece when the circuit is closed, substantially as described.

4. The combination with a gas collecting main and a valve controlling the pressure in said main, of a motor for operating said valve, an expansion chamber communicating with said main and having a movable part and electro-magnetic means controlling the operation of the motor and comprising a movable contact piece connected with the movable part of the expansion chamber, opposing contact pieces arranged on opposite sides and in the path of the other contact piece and movable by the motor away from the intermediate contact piece and means for returning the outer contact pieces to normal position when the circuit is broken, substantially as described.

5. The combination with a gas collecting main and a valve controlling the pressure in said main, of a motor for operating said valve, a movable part subjected to the pressure in said main, and electro-magnetic means controlling the operation of the motor and the movement thereby of said valve according to variations of pressure in the main and comprising a contact piece connected with said movable part, movable contact pieces arranged on opposite sides and in the path of the other contact piece, means tending to move the outer contact pieces toward each other, stops limiting the approach of said outer contact pieces toward each other and holding them normally out of engagement with the intermediate contact piece, an oscillatory part connected with the motor and means adapted to connect either outer contact piece toward which the intermediate contact piece is moved with said oscillatory part, substantially as described.

6. The combination with a gas collecting main and a valve controlling the pressure in said main, of an electric motor connected with said valve, and means for closing and opening the motor circuit and reversing the current through the same, comprising a movable part subjected to the pressure in said main, insulated contact pieces connected with said movable part, opposing contact pieces arranged in pairs on opposite sides and in the paths of the intermediate contact pieces and movable toward and from the same, the outer pairs of contact pieces being cross connected with the circuit, and means for connecting either pair of the outer contact pieces with said oscillatory part when the circuit is closed through them, substantially as described.

7. The combination with a gas collecting main and a valve controlling the pressure in said main, of an electric motor for operating said valve and means for closing and opening the motor circuit and reversing the current through the same, comprising a movable part subjected to the pressure in said main, a pair of insulated contact pieces connected with said movable part, insulated contact pieces arranged in pairs on opposite sides and in the paths of the other contact pieces and movable toward and from the same, means tending to move the outer pairs of contact pieces toward each other, stops for limiting the approach of the outer contact pieces and holding them normally out of engagement with the intermediate contact pieces, the outer pairs of contact pieces being cross connected with the circuit, an oscillatory part connected with the motor and magnetic clutches adapted to connect each pair of outer contact pieces with said oscillatory part and to move them away from the intermediate contact pieces when the circuit is closed through them, substantially as described.

8. The combination with a gas collecting main and a valve controlling the pressure in said main, of an electric motor for operating said valve and means for closing and opening the motor circuit and reversing the current through the same, comprising a movable part exposed to the pressure in said main, a pair of yielding insulated contact pieces connected with said movable part, insulated contact pieces arranged on opposite sides and in the paths of the intermediate contact pieces and movable toward and from the same, the outer pairs of contact pieces being cross connected with the circuit, an oscillatory part connected with the motor and means for connecting each pair of contact pieces when the circuit is closed through them with said oscillatory part, substantially as described.

9. The combination with a gas collecting main and a valve controlling the pressure in said main, of an electric motor for operating said valve, means for closing and opening the motor circuit and reversing the current through the same, comprising an expansion chamber consisting of a receptacle containing a liquid and communicating above the liquid with said main, and a vertically movable bell suspended in said receptacle over its connection with the main, a pair of insulated contact pieces connected with said bell, insulated contact pieces arranged in pairs on opposite sides and in the paths of the other contact pieces and cross connected with the motor circuit and connections with the motor adapted to move each outer pair of contact pieces when the circuit is closed through them away from the intermediate contact pieces, substantially as described.

10. The combination with a gas collecting main and a valve controlling the pressure in said main, of a rocker connected with said valve, an electric motor connected with said rocker and means for closing the motor circuit and reversing the current through the same, comprising a movable part subjected to the pressure in said main, a pair of contact pieces connected with said movable part, an oscillatory part connected with said rocker, rocker arms concentric with said oscillatory part, insulated contact pieces mounted in pairs on said arms on opposite sides and in the paths of the other contact pieces and cross connected with the motor circuit, stops limiting the approach of said arms toward each other, a spring tending to draw said arms together, and clutches adapted to connect each arm when the circuit is closed through the contact pieces thereon with said oscillatory part, substantially as described.

11. The combination with a gas collecting main and a valve controlling the pressure in said main, of an electric motor for operating said valve and means for opening and closing the motor circuit and reversing the current therein according to variations of pressure in said main, substantially as described.

12. The combination with a gas collecting main and a valve controlling the pressure in said main, of an electric motor for operating said valve, means for opening and closing the motor circuit and reversing the current therein according to variations of pressure in said main, and automatic circuit breakers adapted to open the motor circuit at certain limits in the movement of said valve, substantially as described.

13. The combination with a gas collecting main and a valve controlling the pressure in said main, an electric motor for operating said valve and means for closing and opening the motor circuit and reversing the current therein, comprising an adjustably weighted part movable by variations of pressure in said main, a pair of insulated contact pieces, a lever connecting said contact pieces with said movable part, rocker arms provided with separately adjustable insulated contact pieces on opposite sides and in the paths of the other contact pieces, stops for limiting the movement of said arms toward each other, means tending to move said arms toward each other, and means adapted to cause the motor to swing either arm when the circuit is closed through its contact pieces, away from the other arm, substantially as described.

14. The combination with a gas collecting main and a valve controlling the pressure in said main, of a rocker connected with said valve, a motor for operating said rocker and means adapted to automatically close and open the motor circuit and reverse the current therein, comprising a part movable by variations of pressure in said main, a pair of insulated contact pieces connected with said part, an oscillatory disk connected with said rocker, rocker arms pivoted concentric with said disk and provided adjacent thereto with magnetic clutches, a spring tending to move said arms toward each other, stops limiting such movement of said arms, and insulated contact pieces mounted on said arms on opposite sides and in the paths of the other contact pieces and cross connected with the motor circuit, substantially as described.

In witness whereof I hereto affix my signature in presence of two witnesses.

OTTO F. GREIM.

Witnesses:
CHAS. L. GOSS,
ALICE E. GOSS.